United States Patent [19]

Hancock et al.

[11] Patent Number: 4,942,741
[45] Date of Patent: Jul. 24, 1990

[54] REFRIGERANT RECOVERY DEVICE

[76] Inventors: John P. Hancock, 1545 E. 101st St., Indianapolis, Ind. 46280; Ralph A. McClelland, 9546 Hadway Dr., Indianapolis, Ind. 46256

[21] Appl. No.: 374,821

[22] Filed: Jul. 3, 1989

[51] Int. Cl.[5] ............................................. F25B 45/00
[52] U.S. Cl. ........................................ 62/292; 62/77; 62/85; 62/149; 62/474
[58] Field of Search ............... 62/77, 85, 149, 150, 62/292, 474; 141/65

[56] References Cited

U.S. PATENT DOCUMENTS

| | | | |
|---|---|---|---|
| 2,321,964 | 6/1943 | Zieber | 62/115 |
| 2,577,598 | 12/1951 | Zwickl | 62/117 |
| 2,590,061 | 3/1952 | Ash | 62/7 |
| 2,972,235 | 2/1961 | Smith | 62/84 |
| 2,986,894 | 6/1961 | Endress et al. | 62/85 |
| 3,131,548 | 5/1964 | Chubb et al. | 62/150 |
| 3,232,070 | 2/1966 | Sparano | 62/149 |
| 3,478,529 | 11/1969 | Boykin | 62/85 |
| 3,974,659 | 8/1976 | Edwards | 62/85 X |
| 4,110,998 | 9/1978 | Owen | 62/125 |
| 4,261,178 | 4/1981 | Cain | 62/149 |
| 4,285,206 | 8/1981 | Kosser | 62/126 |
| 4,304,102 | 12/1981 | Gray | 62/195 |
| 4,363,222 | 12/1982 | Cain | 62/292 |
| 4,364,236 | 12/1982 | Lower et al. | 62/77 |
| 4,441,330 | 4/1984 | Lower et al. | 62/149 |
| 4,470,265 | 9/1984 | Correia | 62/77 |
| 4,476,688 | 10/1984 | Goddard | 62/149 |
| 4,480,446 | 11/1984 | Margulefsy et al. | 62/474 |
| 4,513,578 | 4/1985 | Proctor et al. | 62/149 |
| 4,523,897 | 6/1985 | Lower et al. | 417/244 |
| 4,528,826 | 7/1985 | Avery, Jr. | 62/292 X |
| 4,539,817 | 9/1985 | Staggs et al. | 62/149 |
| 4,624,112 | 11/1986 | Proctor | 62/149 |
| 4,646,527 | 3/1987 | Taylor | 62/85 |
| 4,688,388 | 8/1987 | Lower et al. | 62/126 |
| 4,768,347 | 9/1988 | Manz et al. | 62/149 |
| 4,805,416 | 2/1989 | Manz et al. | 62/292 |
| 4,809,520 | 3/1989 | Manz et al. | 62/292 |

Primary Examiner—Lloyd L. King

[57] ABSTRACT

The container is provided for use in a refrigerant recovery device. The container includes a refrigerant storage tank having a wall defining an exterior and generally hollow interior. A tank inlet is provided through which refrigerant can flow from the exterior of the tank to the interior of the tank. A tank outlet is provided through which refrigerant can flow from the interior of the tank to the exterior of the tank. A contaminant canister is provided for separating contaminants from refrigerant and for storing the contaminants so separated. The contaminant canister includes a wall defining an interior and an exterior, and is disposed substantially within the interior of the refrigerant storage tank. A canister inlet is provided through which refrigerant can flow into the canister and a canister outlet is provided through which refrigerant can flow out of the canister. A canister removal means is provided for removing contaminant from the canister.

20 Claims, 2 Drawing Sheets

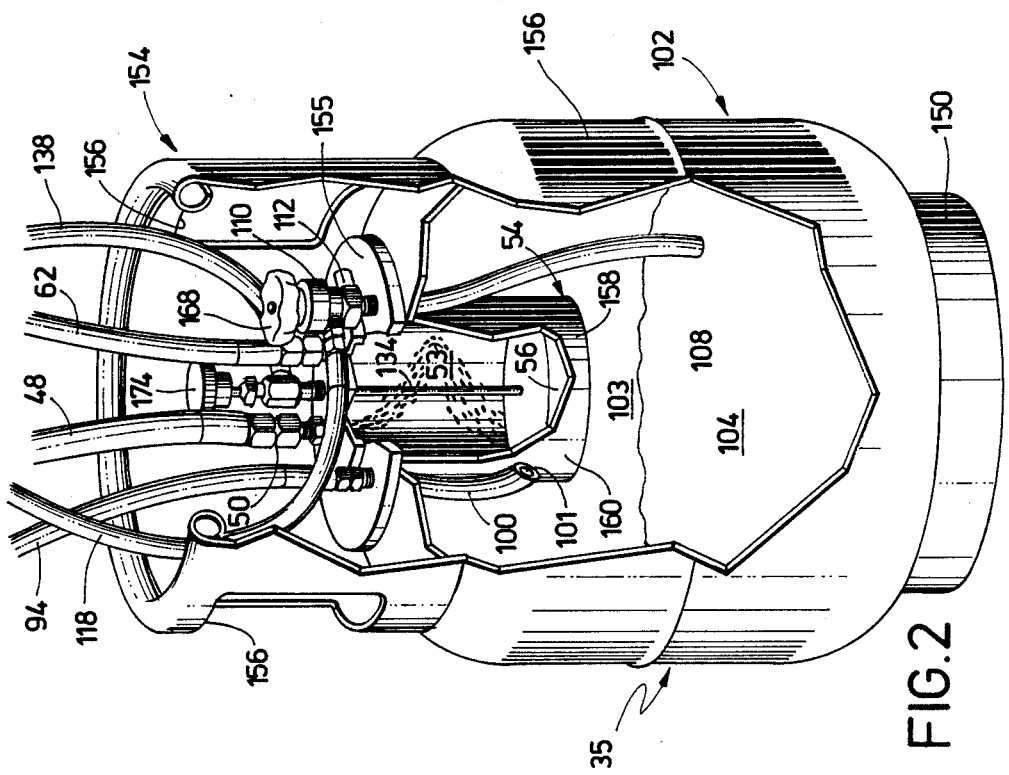
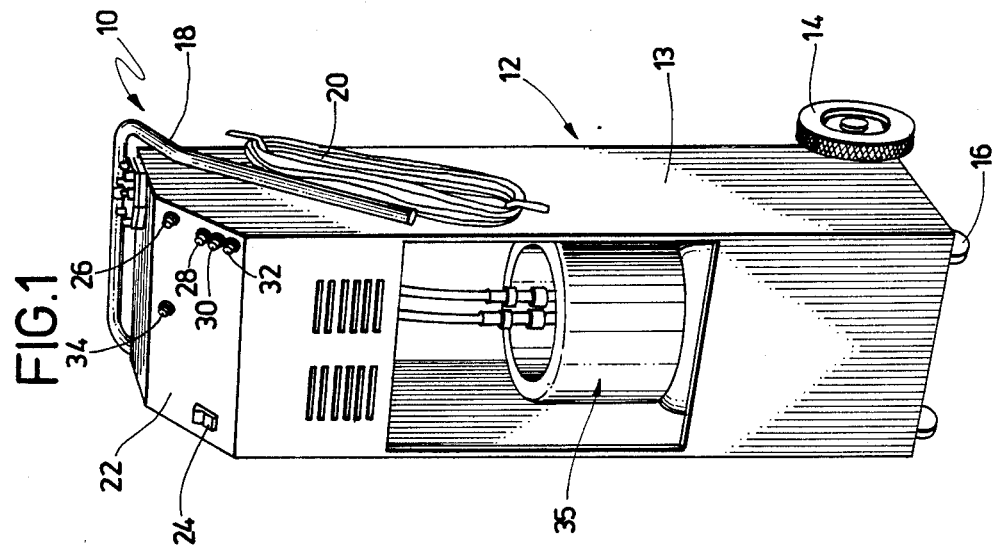

REFRIGERANT RECOVERY DEVICE

FIELD OF THE INVENTION

The present invention relates to a device for use in connection with a mechanical refrigeration system, and more particularly to a device for recovering refrigerant from a mechanical refrigeration system, processing the refrigerant so recovered to remove contaminants therefrom, and storing the processed refrigerant.

BACKGROUND OF THE INVENTION

A wide variety of mechanical refrigeration systems are currently in use in a wide variety of applications. These applications include refrigerators, heat pumps, and air conditioners used both in vehicles and in buildings. The vast majority of mechanical refrigeration systems operate according to similar, well known principles, employing a closed-loop fluid circuit through which a refrigerant flows. Fluorocarbon refrigerants (such as DUPONT FREON refrigerant) are the types of refrigerants used most widely today. DUPONT and FREON are registered trademarks of E.I. duPont deNeimors of Wilmington, Del.

Those familiar with mechanical refrigeration systems recognize that such systems periodically require service. This service often takes the form of the addition of refrigerant into the system to replace refrigerant which has escaped from the system.

Before adding refrigerant, it is often necessary to evacuate the refrigerant remaining in the system. Typically, this remaining refrigerant is removed by bleeding the refrigerant off to the atmosphere.

In recent years, much concern has arisen about this practice of releasing fluorocarbon-based refrigerants into the atmosphere. It is believed that the release of such fluorocarbons depletes the concentration of ozone in the atmosphere. This depletion of the ozone layer is believed to adversely impact the environment and human health.

To avoid releasing these fluorocarbons into the atmosphere, devices have been constructed that are designed to recover the refrigerant from the refrigeration system. These devices often include means for processing the refrigerant so recovered so that the refrigerant can be reused. Examples of such devices are shown in Koser U.S. Pat. No. 4,285,206; Staggs et al U.S. Pat. No. 4,539,817; Lower et al U.S. Pat. No. 4,364,236; Lower et al U.S. Pat. No. 4,441,330; Goddard U.S. Pat. No. 4,476,668; Manz et al U.S. Pat. No. 4,768,347; and Cain U.S. Pat. No. 4,261,178.

Although the devices disclosed in these patents most likely perform their intended functions to one extent or another, room for improvement exists.

It is, therefore, one object of the present invention to provide an improved storage container and contaminant canister for use in connection with a refrigerant recovery device.

SUMMARY OF THE INVENTION

In accordance with the present invention, a container is provided for use in a refrigerant recovery device. The contained comprises a refrigerant storage tank having a wall defining an exterior and a generally hollow interior. A tank inlet means is provided through which refrigerant can flow from the exterior of the tank to the interior of the tank. A tank outlet means is provided through which refrigerant can flow from the interior of the tank to the exterior of the tank. A contaminant canister is provided for separating contaminants from refrigerant and for storing the contaminants so separated. The contaminant canister includes a wall defining an interior and an exterior, and is disposed substantially within the interior of the refrigerant storage tank. A canister inlet means through which refrigerant can flow into the canister is provided along with a canister outlet means through which refrigerant can flow out of the canister. A contaminant removal means is also provided for removing contaminant from the canister.

Preferably, the canister inlet means and outlet means are disposed adjacent to the top of the canister, and the canister has sufficient volume to decrease the velocity of flow of refrigerant flowing from the canister inlet means to permit contaminants in the refrigerant to become separated from the refrigerant. Additionally, the canister inlet means and canister outlet means are preferably configured to cause oil-type contaminants in the refrigerant to flow in a swirling motion in the canister to foster the impingement of droplets of contaminant against the side wall of the canister.

One feature of the present invention is that a container is provided that serves both as an oil separation canister and as a storage tank for storing processed, recovered refrigerant. This feature has the advantage of placing the tank and the contaminant canister in a heat exchange relation. By placing the contaminant canister in a heat exchange relation with the refrigerant tank, the operation of the canister is improved by the warming effect of the refrigerant entering into the storage tank. Additionally, the operation of the storage tank is improved by the cooling effect of the canister on the refrigerant entering into the storage tank.

It has been found by the applicants that refrigerant being drawn into the device from a refrigeration system, such as an automotive air conditioning system, enters into the contaminant canister at a low pressure, and hence tends to cool the canister. Over time, the canister may cool sufficiently to cause the refrigerant in the canister to liquefy. It is undesirable for such liquefied refrigerant to exist in the canister due to the likelihood that such liquefied refrigerant will be drawn into a compressor disposed downstream of the contaminant canister.

Conversely, refrigerant leaving the compressor, and entering into the tank tends to be under high pressure, and relatively warm. By providing means in the container to direct this incoming refrigerant against the canister, the canister is warmed. The warming of the canister tends to convert any liquid refrigerant in the canister to gaseous refrigerant, thus reducing the risk that liquid refrigerant will be drawn into the compressor from the canister. Additionally, the relative coolness of the canister helps to foster the condensation of refrigerant entering into the tank through the tank inlet thereby facilitating the storage of the refrigerant in the tank as a liquid.

Another feature of the present invention is that the inlet and outlet of the canister are configured to induce a "swirling" motion of the refrigerant in the canister. This feature has the advantage of facilitating the separation of contaminants such as oil from the refrigerant by fostering the impingement of oil droplets on the wall of the canister.

Additional features and advantages of the present invention will become apparent to those skilled in the art upon consideration of the following detailed description of a preferred embodiment exemplifying the best mode of carrying out the invention as perceived presently.

BRIEF DESCRIPTION OF THE DRAWINGS

FIG. 1 is a perspective view of the refrigerant recovery device of the present invention;

FIG. 2 is a perspective, partly cut away view of the container of the present invention.

DETAILED DESCRIPTION OF PREFERRED EMBODIMENTS

Figure 3:
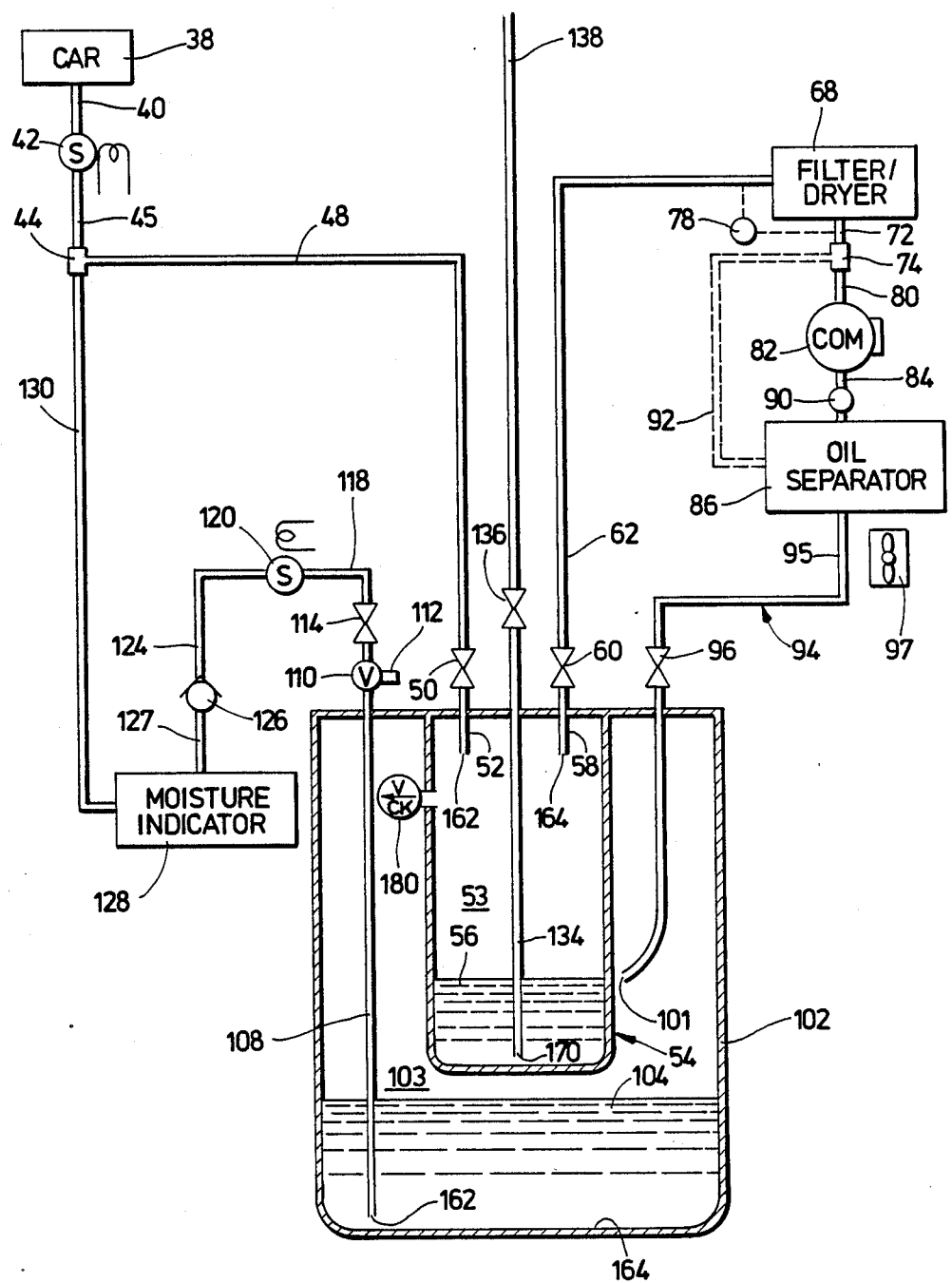
FIG. 3 is a schematic view of the present invention.

The refrigerant recovery device 10 of the present invention is shown in FIG. 1 as including a movable cart 12 on which are mounted the various components of the device 10. The cart 12 includes a plurality of panels, such as panel 13, which comprise the frame of the device 10. A pair of wheels 14 are provided to support the device 10 on the ground, and enable the user to move the device 10. A second pair of wheels 16 are also provided for support. A handle 18 is provided to facilitate movement of the device, and a power cord 20 is provided to enable the user to couple the components of the device 10 to a source of electricity.

A control panel 22 is provided for enabling the user to control the operation of the device 10. The control panel 22 includes a pair of switches to control the operation of the device, including a three position switch 24, and a cycle-start switch 26. The three positions in which the three-position switch 24 can be placed are: (1) the "recovery mode" position; (2) the "end cycle" position; and (3) the "recycle mode" position.

Additionally, the control panel 22 can include a plurality of indicator lights such as an indicator light 28 which indicates that the system is operating, an indicator light 30 that indicates that the refrigerant storage tank is full, and an indicator light 32 for indicating that the filter component of the device is dirty. The control panel 22 also includes a moisture display light 34 to permit the user to evaluate the condition of the refrigerant flowing through the device 10. The moisture indicator display 34 can take the form of a viewing glass, an indicator light, a gauge, or a read-out, depending upon the type of moisture indicator used.

A removable container 35 is housed in the lower portion of the cart 12. As will be explained below, the container 35 contains both a contaminant removal means and a tank means for storing recovered and processed refrigerant. In many respects, the container 35 has a size, shape, and construction similar to the size, shape, and construction of a propane-containing tank used in connection with an outdoor barbecue grill.

The various components of the device 10 are best explained with reference to FIG. 3.

The device 10 is coupled to a refrigeration system, such as the air conditioning system 38 of an automobile. A conduit 40 is provided for coupling the device 10 to the refrigeration system 38. Preferably, conduit 40 comprises a ⅜ inch (0.95 cm) high-pressure hose of the type typically used with air conditioning recharger systems. Conduit 40 is provided with an appropriate coupling (not shown) for coupling the conduit 40 to the refrigeration system 38. Refrigerant flowing through conduit 40 flows through a solenoid valve 42. Depending on whether the solenoid valve 42 is in its opened, or closed position, refrigerant will either be permitted to flow through the valve 42 (if open), or will be prevented from flowing through the valve 42 (if closed). An example of a commercially available solenoid valve 42 which will function in the present invention is a SKINNER PRECISION, ⅛ inch (0.3175 cm) orifice, 2-way solenoid valve, manufactured by the SKINNER PRECISION CORPORATION. After passing through solenoid valve 42, the refrigerant flows through a conduit 45, which preferably comprises a ¼ inch (0.635 cm) copper tube, and flows into a T-connector 44. Refrigerant flows out of T-connector 44 and into and through conduit 48. Conduit 48 preferably comprises a ⅜ inch (0.925 cm) air conditioning type hose. Alternately, conduit 48 can have a first portion comprised of ¼ inch (0.635 cm) copper tubing and a second portion (that portion adjacent to quick-connect coupling 50) which comprises the air conditioning type hose. The quick-connect coupling 50 permits the user to quickly engage, and disengage the conduit 48 and the canister inlet 52.

The canister inlet 52 is disposed adjacent to the top of the interior of a contaminant canister 54, and provides a means through which contaminant-laden refrigerant can flow into the contaminant canister 54. As will be described in more detail below, the contaminant canister 54 provides a means for separating contaminants (predominantly oil-type contaminants) from the refrigerant, and provides a place wherein contaminants 56 so separated can be stored. Refrigerant flows out of the canister 54 through a canister outlet 58. A quick-connect type coupling 60 is provided for coupling the canister outlet 58 to a conduit 62, conduit 62 conducts refrigerant between the canister outlet 58 and the filter/dryer 68. The filter/dryer 68 includes a filter for filtering particulant matter and removing moisture and acid from the refrigerant.

Several commercially available filter/dryers 68 exist which will serve well in the present invention. One example of such a filter/dryer is the Model 2CFA filter/dryer made by the SUPERIOR VALVE COMPANY. Additionally, suitable filter/dryers are available from SPORLAN VALVE COMPANY.

Refrigerant flowing out of the filter/dryer 68 flows through conduit 72, and through a T-connector 74. A delta-P switch 78 can be coupled between the inlet and the outlet of the filter/dryer 68. The delta-P switch 78 measures the difference in pressure between the inlet side and the outlet side of the filter/dryer 68. The existence of too great a difference in pressure between the inlet and outlet side of the filter/dryer 68 indicates that the filter/dryer 68 is probably clogged. If the difference in pressure between the inlet side and the outlet side of the filter/dryer 68 is too great, the delta-P switch 78 will send a signal to a controller (not shown) to shut down the system. Additionally, a signal will be sent to the "filter dirty" indicator light 32, to indicate to the user that the device 10 is shut down in response to a clogged filter.

A conduit 80 is provided for transporting refrigerant between T-connector 74 and compressor 82. The compressor 82 is provided for elevating the pressure of the refrigerant. The compressor 82 is preferably a ½ or ¼ horsepower compressor. Commercially available compressors that will function in the present invention are available from a variety of compressor manufacturers.

A conduit 84 conducts the high pressure, gaseous refrigerant compressed by compressor 82, into an oil separator 86. A high-pressure cut-off switch 90 is placed in conduit 84. Preferably, high pressure switch 90 has a cut-out pressure of 250 to 350 psig. The purpose of the high pressure cut-off switch 90 is to shut down the device 10 in an "over-pressure" situation. Commercially available high pressure cut-off switches of the type described above are available from TEXAS INSTRUMENTS CORPORATION of Dallas, Tex.

The oil separator 86 helps to remove oil from the refrigerant flowing out of the compressor 82, and through the separator 86. As will be appreciated, compressors often require oil to operate and tend to discharge oil into the refrigerant that the compressor 82 is compressing. It is important to remove this oil from the refrigerant. In the oil separator 86, oil is separated from the high-pressure, oil-laden refrigerant flowing out of the compressor 82 and into the oil separator 86. The oil separated by the separator 86 resides at the bottom of the oil separator's 86 tank. An example of a commercially available oil separator is the Model S-5580 oil separator manufactured by A.C. & R. COMPONENTS, INC., of Chatham, Ill.

The oil separator 86 includes a float valve (not shown) disposed within the oil separator 86. When the float valve indicates that oil within the oil separator 86 has reached a pre-determined level, the float valve allows oil to be bled off the separator 86. This bled off oil flows through a capillary tube type return line 92, through conduit 80, and back into compressor 82. This return of oil from oil separator 86 provides oil to the compressor 82. As will be appreciated, this oil improves the operation of the compressor 82 by providing lubricating oil for the compressor 82.

High-pressure, gaseous refrigerant flows out of oil separator 86 into conduit 94. Preferably, conduit 94 is comprised of standard, ⅜ inch (0.9525 cm) air conditioning hose. Conduit 94 includes a portion 95 deposed adjacent to a discharge cooling fan 97. Portion 95 of conduit 94 is preferably comprised of capillary-type tubing having an inner diameter of about 0.084 inches (2.1 mm). Discharge fan 97 is a standard electrically operated fan. The conduit 94 terminates at a quick-connect type coupling 96, that couples the conduit 94 to the tank inlet tube 100.

Refrigerant exiting the terminus 101 of the tank inlet tube 100 flows into the interior 103 of the storage tank 102. The refrigerant condenses by cooling of free air convection on the exterior walls 156 of tank 102, in the tank 102 and forms a pool 104 of refrigerant at the bottom of the tank 102. Refrigerant can flow out of the interior 103 of tank 102 through the tank outlet tube 108. Refrigerant flowing out of the tank 102 through the tank outlet tube 108, flows through a valve 110 disposed exteriorly of the tank 102. Valve 110 includes a pressure release valve 112. A quick-connect type coupling 114 couples the tank outlet 108 and conduit 118. Conduit 118 is preferably comprised of ⅜ inch (0.9525 cm) air conditioning hose.

The refrigerant flows out of conduit 118, and through a solenoid valve 120. Solenoid valve 120 is similar to solenoid valve 42 in construction, and is movable between an opened position wherein refrigerant can flow through the solenoid valve 120, and a closed position wherein refrigerant is prevented from flowing through the solenoid valve 120. Refrigerant flowing out of solenoid valve 120 flows through a conduit 124, which is preferably comprised of ¼ inch (0.635 cm) copper tube, and through a check valve 126.

Check valve 126 is a one-way check valve permits refrigerant to flow from conduit 124 to conduit 127 and into the moisture indicator 128, but does not permit refrigerant in the moisture indicator 128 to flow back through conduit 127 and into conduit 124. The primary purpose of the check valve 126 is to enable refrigerant to flow from the tank into the moisture indicator 128, and the other associated parts "downstream" of the moisture indicator 128. but to prevent refrigerant from flowing from the air conditioning system 38, directly into the interior 103 of tank 102.

Moisture indicator 128 is coupled to the moisture indicator display 34 on the control panel 22 of the device 10, for permitting the user to determine the moisture content of the refrigerant flowing through the moisture indicator 128. As will be appreciated, the moisture indicator 128 and its display 34 is used by users of the device as an indicator of the quality of the refrigerant flowing therethrough. If the moisture indicator display 34 indicates that too much moisture resides in the refrigerant, the user will know that further processing of the refrigerant is necessary.

A capillary tube-type conduit 130 extends between the moisture indicator 128 and T-connector 44, to permit refrigerant to flow therethrough upon leaving the moisture indicator. Preferably, the capillary tube-type conduit 130 has an inner diameter of between about 0.020 inches (0.05 cm) and 0.050 inches (0.127 cm).

The container 35 which includes both the contaminant canister 54 and the tank 102 for storing refrigerant, is best described with reference to FIG. 3.

A contaminant removal means is also provided which includes a contaminant removal tube 134 disposed in the interior 53 of canister 54. The contaminant removal means 134 extends through the tank 102 to the exterior thereof, and terminated at a coupling 136. Coupling 136 is coupled to a conduit 138 which transports the contaminants, under pressure, away from the container 35 to a suitable receptacle (not shown).

The container 35 comprises a generally cylindrical tank 102 having a base 150 for supporting the tank 102 on a surface, and a cap 154. The cap 154 extends upwardly from the top of the tank 102, to a point above the valves (e.g., valve 110) on top of the container, The cap 154 serves a dual purpose. The first purpose is to provide a handle for the user to transport the container 35. The handle is provided through the cutouts, 156, formed in the cap 154. The second purpose served by the cap 154 is to protect the valves, such as valve 110. By extending above the valves, the cap 154 prevents the valves from becoming broken or damaged if the container 35 is dropped on its top. The tank 102 includes an outer wall 156, which defines the exterior of the tank 102, and the interior 103 of the tank 102. As the canister 54 is disposed within the tank 102, that portion of the interior 103 of the tank outside of the canister 54, comprises the outer chamber of the container 35. The interior 103 serves as the area in which processed refrigerant 104 is stored. The capacity of the outer chamber interior 103 of the tank is sufficient to hold generally about 50 pounds of refrigerant.

A disk shaped plate 155 is welded to the exterior surface of the wall 156 of the tank 102. The plate 155 is centrally positioned on the top of the tank 102, and serves as an anchor for the canister 54. Additionally, plate 155 serves as an anchor for the tank inlet tube 100, tank outlet tube 108, canister inlet means 52, canister outlet means 58, and contaminant removal means 134, all of which pass through the disk-shaped plate 155.

Tank inlet tube 100 passes through plate 155 and is provided for permitting refrigerant to flow into the interior 103 of the tank 102. The inlet tube 100 includes a terminus 101 which is disposed adjacent to the exterior surface 158 of the wall 160 of the contaminant canister 54. The terminus 101 of the tube is positioned adjacent to the exterior surface 158 of the wall 160, to direct refrigerant exiting from the terminus 101 against the exterior surface 158 of wall 160. As the contaminant canister 54 is preferably comprised of a heat-conductive material, the refrigerant exiting from the terminus 101 is placed in a heat exchange relation with the canister 54.

The tank outlet tube 108 is provided for removing refrigerant 104 from the interior 103 of the tank 102. As best shown in FIG. 3, the terminus 162 of the outlet tube 108 is disposed adjacent to the bottom 164 of the interior 103 of the tank 102. The terminus 162 is so positioned so that the material drawn through the tube 108 will consist primarily of liquefied refrigerant.

Outlet tube 108 passes through plate 155 and terminates at valve 110. Valve 110 is a user actuable valve, having a handle 168 to permit the user to open and close the valve. A pressure relief valve 112 is also provided as a part of valve 110. The pressure release valve 112 is set to allow refrigerant to pass therethrough if the pressure within the interior 103 of tank 102 exceeds 300-400 psig.

The contaminant canister 54 includes a wall 160 defining an exterior and a generally hollow interior 53. The contaminant canister 54 is generally cylindrical in shape. The contaminant canister is disposed within the interior 103 of the container 35, and is disposed adjacent to the top of the container 35. The wall 160 of the contaminant canister also serves as an interior boundary wall of the interior 103 of the tank 102.

The contaminant canister 54 is provided for separating oil from refrigerant passing through the canister 54 and, more particularly, for providing a first-stage of oil separation for refrigerant being withdrawn from the air conditioning system 38. The contaminant canister inlet 52 includes a terminus disposed adjacent to the top of the interior 53 of the canister 54. As refrigerant flows out of the terminus of the canister inlet 52, the increased volume provided by the canister interior 53 (relative to conduit 48) causes the velocity at which the refrigerant is flowing to be reduced substantially. This velocity reduction causes oil (here shown as a plurality of droplets) in the refrigerant to become separated from the refrigerant.

The canister inlet 52 is configured to cause the oil droplets entering the canister 54 to flow in a swirling motion against the interior surface of the wall 160. foster the formation and impingement of the oil droplets. Eventually, the oil droplets that form against the wall travel downwardly into the pool of contaminant 56 collected at the bottom of the canister.

Additionally, by directing the droplets (and, hence, the refrigerant) against the canister wall, the refrigerant introduced into the canister can affect the temperature of the canister wall 160. As the refrigerant flowing though the canister inlet 52 is typically cool, the impact of the refrigerant against the canister wall 160 tends to cool the canister wall 160. The cooling of the canister wall 160 cools the interior 103 of the tank 102, and tends to cool the refrigerant flowing out of the terminus 101 of tank inlet tube 100. By so cooling this refrigerant flowing out of tube 100, the relatively cool canister 104 fosters the condensation of refrigerant in the interior 103 of tank 102.

In a complimentary, heat-exchange related manner, the relative warmth of the refrigerant flowing out of the terminus 101 of tank inlet tube 100 tends to warm the wall 160 of the canister 54, and, hence, the refrigerant contained within the interior 53 of the canister 54. This warming of the refrigerant in the interior 53 of the canister 54 tends to convert any liquid refrigerant contained therein into gaseous refrigerant. This warning of the refrigerant within the canister 54 is desirable, as it tends to prevent liquid refrigerant from being drawn from the canister 54 and transmitted into the compressor 82.

The canister outlet 58 has a terminus 164 which is also disposed adjacent to the top of the contaminant canister 54. The canister outlet 58 is positioned adjacent to the top of the interior 53 of the contaminant canister 54, to ensure that the material withdrawn from the canister 54 consists predominantly of gaseous refrigerant, and contains as little liquefied refrigerant or oil-type contaminant as possible.

The contaminant removal tube 134 includes a terminus 170 which is disposed adjacent to the bottom of the interior 53 of contaminant canister 54. The terminus 170 is so placed to ensure that the material being withdrawn through the terminus 170 and contaminant removal tube 134 consists primarily of the oil-type contaminants 56 collected at the bottom of the contaminant canister 54. The contaminant removal tube 134 extends through the disk-shaped plate 155 to the exterior of the tank 54, and terminates at a handactuable spigot-type valve 174. Valve 174 is actuable by the user to permit the user to control the flow of contaminants out of the interior 53 of the canister 54. Optionally, a quick-connect coupling 136 can be used to couple the valve 174 to conduit 138. Conduit 138 terminates at a receptacle (not shown) for receiving the contaminant removed from the canister 54.

A pressure-relief type check valve 180 can be placed in the side portion of the wall 160 of the canister 54. Check valve 180 should be placed above the normal "full" level of the contaminant 56 in the canister 54. Check valve 180 is a one-way valve, that permits material to flow only from the interior 53 of the canister 54, to the interior 103 of the tank 102. The primary purpose served by check valve 180 is that of a pressure-release valve, to permit refrigerant to escape from the interior 53 of canister 54 if an over-pressure situation develops within the interior 53 of canister 54. Preferably, the check valve 180 is set to release materials from the interior 53 of canister 54 if the pressure within the interior 53 of canister 54 exceeds about 300-400 psig. As discussed above, if the release of material from the interior 53 of canister 54 through the pressure relief check valve 180 causes an over-pressure situation within the interior 103 of tank 102, the interior 103 of the tank is vented through pressure release valve 112.

In operation, the device 10 of the present invention can function in two modes: the recovery mode and the recycle mode.

The recovery mode is the mode in which device 10 is coupled to the air conditioning system 38, for removing refrigerant from the air conditioning system of the car. In the recovery mode, solenoid valve 42 is placed in its opened position, and solenoid valve 120 is placed in its closed position. The compressor 82 is actuated to begin drawing refrigerant from the air conditioning system 38. Refrigerant is drawn through conduits 40 and 45, through T-connector 44, through conduit 48, and through the canister inlet means 52. Refrigerant flowing out of the terminus 162 of the canister inlet means flows in a swirling motion (as shown in FIG. 2) so that the contaminant-laden refrigerant impacts against the interior surface of wall 160. The oil-type contaminants tend to form against the wall into droplets. These droplets then fall under the action of gravity, into the pool of contaminant 56 in the bottom of the contaminant canister 54. Relatively oil-free refrigerant then flows through the canister outlet means 58, and into conduit 62, and into the filter/dryer 68. In the filter/dryer 68, particulant matter and moisture and acid are removed from the refrigerant. The refrigerant then flows out of the filter/dryer 68, into conduit 72, through T-connector 74, through conduit 80, and into compressor 82.

A compressor 82 compresses the low pressure gaseous refrigerant that enters the compressor through conduit 80, into high pressure gaseous refrigerant which is delivered into conduit 84. This high-pressure gaseous refrigerant flows through conduit 84 into oil separator 86. Oil contained within the refrigerant is separated from the refrigerant in the oil separator 86. The relatively oil-free refrigerant then flows through conduit 94, into the tank inlet tube 100. Refrigerant flowing out of the terminus 101 of the inlet tube 100 is directed against the exterior surface 158 of canister wall 160. As discussed above, the canister wall 160 is generally cooler than the interior 103 of the tank 102. This coolness of the canister wall 160 fosters the condensation of the high-pressure gaseous refrigerant flowing out of the terminus 101 of canister inlet tube 100. The refrigerant so condensed in the tank 102 falls through the action of gravity into the pool 104 of refrigerant at the bottom of the tank 102. As solenoid valve 120 is closed during the recovery mode, refrigerant is prevented from entering into the moisture indicator 128. Preferably, valve 110 is also in its closed position to prevent refrigerant from flowing out of the tank outlet tube 108, past the valve 110. Additionally, valve 174 (FIG. 2) on the contaminant removal means should also be in its closed position.

The device is operated in its recovery mode until all of the refrigerant is withdrawn from the air conditioning system 38 to which the device 10 is attached. When the air conditioning system 38 is sufficiently devoid of refrigerant, a vacuum is pulled on the system of zero to 17 inches of mercury. When this condition is sensed by a mercury vacuum switch or flow switch (not shown), disposed in conduit 40, the solenoid 42 is actuated to close, thus preventing further materials from being drawn from the air conditioning system of car 38. After solenoid 42 is actuated to close, the compressor 82 is allowed to run for a short period of time to remove pressure from the various conduits and components within the device 10.

Although contaminants are removed from the refrigerant flowing through the device 10 in its recovery mode, the applicants have found that it is often necessary to further clean the refrigerant to place the refrigerant in a condition wherein it is suitable for introduction into another air conditioning system. Thus, the device 10 is operable in its recycle mode to perform this further cleaning operation.

When the device 10 is placed in its recycle mode, solenoid 42 is placed in its closed position and solenoid 120 is placed in its open position.

The compressor 82 is actuated to draw refrigerant through the system. However, it will be appreciated that the relatively high pressure of the refrigerant contained within the interior 103 of tank 102 will tend to force refrigerant out of tank outlet tube 108. When in its recycle mode, valve 110 should be placed in its open position to permit refrigerant to flow therethrough.

During the device's 10 recycle mode, refrigerant is drawn from tank 102 through terminus 162 into the tank outlet means 108. The refrigerant then flows through valve 110, conduit 118, solenoid valve 120, conduit 124, check valve 126, and into the moisture indicator 128. The moisture indicator 128 is coupled to the moisture indicator display 34 on the control panel of the device 10 to indicate to the user the amount of moisture in the refrigerant, and, hence, the amount of processing still required for the refrigerant.

The refrigerant then flows through capillary tube conduit 130 into T-connector 44. As solenoid valve 42 is in its closed position, the refrigerant is directed to flow through conduit 48, and through the canister inlet 52 into the interior 53 of canister 54. Similar to when the device 10 is operating in its recovery mode, the purpose of passing the refrigerant through the contaminant canister 54 in the recycle mode is to remove oil-type contaminants from the refrigerant.

Refrigerant then flows out of the canister 54 through the conduit 58. Refrigerant then flows through conduits 62 into the filter/dryer wherein moisture, acid, and particulant matter are removed. The refrigerant then flows through conduit 72, T-connector 74 and conduit 80 into compressor 82, wherein the low-pressure gaseous refrigerant is compressed into high-pressure gaseous refrigerant.

High pressure gaseous refrigerant flows out of the compressor 82, and through the oil separator 86, where oil picked up in the compressor 82 is separated from the refrigerant. Refrigerant flows out of the oil separator 86, into conduit 94, and into the tank inlet tube 100. Refrigerant then flows out of terminus 101 of the tank inlet 100, is directed against the exterior surface 158 of the wall 160 of canister 54, and, ultimately, becomes a part of the pool 104 of refrigerant. Once in the pool 104, the refrigerant is eligible to be recycled again through the system.

This recycling of refrigerant continues to occur until a point is reached wherein the refrigerant is sufficiently clean, so as to be suitable for introduction into an air conditioning system. When the refrigerant has reached an acceptable state of cleanliness, the device 10 can be turned off. When so turned off, the compressor 82 continues to run for a short period of time to remove any pressure from the system. By so removing the pressure from the system, the removal of the various conduits via the respective quick-connect couplings 114, 50, 136, 60, 96, can be done safely.

The device also includes a means for determining the amount of refrigerant in tank 102. Such a device can comprise a scale (not shown). The scale should be operatively coupled to the indicator light 30 that indicates that the refrigerant storage tank 102 is full. The indicator light 30 indicates to the user that the storage tank is full, to inform the user that additional refrigerant should not be withdrawn from any other air conditioning systems. As a safety feature, the scale can be operatively coupled to solenoid 42, to place solenoid 42 in its closed position when the tank 102 is full.

When the tank 102 is full, if the refrigerant contained within the tank 102 is not sufficiently clean, the device 10 should be placed in its recycle mode to remove contaminants from the refrigerant. Additionally, contaminants 56 contained within the contaminant canister 54 should be removed from the contaminant canister 54 via the contaminant removal outlet means 134 and conduit 138. This contaminant removal can be performed by connecting conduit 138 to a pump for removing the contaminant. However, if sufficient pressure exists within the interior 53 of the canister, the pressure of the canister may be utilized to force the contaminant in pool 56 out of the contaminant removal means 134.

When the tank 102 is full, the contaminant has been removed from the contaminant canister 54, and the refrigerant 104 contained within the tank 102 has been cleaned sufficiently, the conduits 118, 48, 138, 62, and 94, are disconnected from the container 35 at the respective quick-connect valves 114, 50, 136, 60, 96. The container 35 can then be separated from the device 10 and replaced with an empty container 35, for receiving further refrigerant. The full container 35 can then be used in connection with a refrigerant recharging system to introduce the refrigerant contained in the tank 102 into an air conditioning system in need of additional refrigerant.

Having described the invention in detail, and by reference to the preferred embodiments thereof, it will be apparent that modifications and variations are possible without departing from the scope of the invention as defined in the appended claims.

What is claimed is:

1. A container for use in a refrigerant recovery device, the container comprising:
    a refrigerant storage tank having a wall defining an exterior and a generally hollow interior,
    a tank inlet means through which refrigerant can flow from the exterior of the tank to the interior of the tank,
    a tank outlet means through which refrigerant can flow from the interior of the tank to the exterior of the tank,
    a contaminant canister for separating contaminants from refrigerant and for storing the contaminants so separated, the contaminant canister including a wall defining an interior and an exterior, and being disposed substantially within the interior of the refrigerant storage tank,
    a canister inlet means through which refrigerant can flow into the canister,
    a canister outlet means through which refrigerant can flow out of the canister and
    a contaminant removal means for removing contaminant from the canister.

2. The container of claim 1 wherein the canister inlet means is disposed adjacent to the top of the canister,
    the canister outlet means is disposed adjacent to the top of the contaminant cannister, and
    the canister has sufficient volume to decrease the speed of flow of refrigerant flowing from the canister inlet means to permit contaminants in the refrigerant to become separated from the refrigerant.

3. The container of claim 1 wherein the contaminant canister includes a check valve to allow materials in the contaminant canister to flow into the tank in the event of an over-pressure condition.

4. The container of claim 1 wherein the contaminant canister is generally cylindrical, and is disposed generally adjacent to the top of the interior of the tank.

5. The container of claim 1 wherein the tank inlet means includes a tube means for directing refrigerant flowing out of the tube means against the wall of the canister, for warming the cannister.

6. The container of claim 1 wherein the contaminant removal means includes a terminus disposed adjacent to the bottom of the interior of the canister.

7. The container of claim 1 wherein each of the tank inlet means, the tank outlet means, the canister outlet means, and the canister inlet means includes a quick-connect valve fitting member.

8. The container of claim 1 wherein the canister inlet means and the canister are configured to cause oil-type contaminants in the refrigerant to flow in a swirling motion in the canister to foster the condensation of droplets of contaminant against the side wall of the canister.

9. The container of claim 1 wherein the tank outlet means includes a tube means extending into the tank and having a terminus disposed adjacent to the bottom of the tank for facilitating withdrawal of liquified refrigerant from the tank.

10. The container of claim 1 wherein the canister is disposed in a heat exchange relation with tank, so that in operation, the refrigerant flowing into the tank will warm the canister, and refrigerant flowing into the canister will cool the tank.

11. A container for use in a refrigerant recovery device, the container comprising:
    a refrigerant storage tank having a wall defining an exterior and a generally hollow interior,
    a generally cylindrically shaped contaminant canister for separating contaminants from refrigerant and for storing the contaminants so separated, the canister being disposed in the interior of the tank in a heat exchange relationship thereto, and including a canister wall defining an exterior and an interior of the canister, the canister interior having sufficient volume so as to decrease the speed of flow of refrigerant flowing into the canister to permit contaminants in the refrigerant to become separated from the refrigerant in the canister, and a check valve to allow materials in the canister to flow into the interior of the tank in the event of an over-pressure situation,
    a tank inlet means through which refrigerant can flow from the exterior of the tank to the interior of the tank, the tank inlet means including a tube means extending into the interior of the tank means, the tube means having a terminus positioned for directing refrigerant flowing out of the terminus against the wall of the canister,
    a tank outlet means through which refrigerant can flow from the interior of the tank to the exterior of the tank, the tank outlet means including a tube means extending into the interior of the tank and having a terminus disposed adjacent to the bottom thereof for facilitating withdrawal of liquified refrigerant from the tank,
    a canister inlet means disposed adjacent to the top of the canister, through which refrigerant can flow into the interior of the canister,
    a canister outlet means disposed adjacent to the top of the canister, through which refrigerant can flow out of the canister, the canister inlet means and canister outlet means being configured to cause oil-type contaminants in the refrigerant to flow in a swirling motion in the canister to foster the condensation of droplets of contaminant on the wall of the canister, and a contaminant removal means for removing collected contaminants from the canister, the contaminant removal means including a tube-means disposed in the interior of the canister having a terminus disposed adjacent to the bottom of the canister.

12. The container of claim 11 wherein each of the tank inlet mean, the tank outlet means, the canister inlet means, the canister outlet means and the contaminant removal means includes a quick-connect valve fitting member.

13. The container of claim 12 wherein the tank outlet means includes a check valve means for allowing materials to flow out of the tank in the event of an over-pressure situation.

14. A refrigerant recovery device for withdrawing refrigerant from a refrigeration system, treating the refrigerant so withdrawn to remove contaminants from the refrigerant, and holding the treated refrigerant, the refrigerant recovery device comprising:
   a withdrawal means for withdrawing refrigerant from the refrigeration system,
   a filter means in fluid communication with the withdrawal means for removing particulate matter from the refrigerant,
   a moisture removing means in fluid communication with the filter means for removing moisture from the refrigerant, a compressor means in fluid communication with the moisture removing means for compressing gaseous refrigerant into liquid refrigerant, and
   a container means including: a tank for holding the treated refrigerant and a contaminant canister for removing contaminants from the refrigerant, the canister being disposed interiorly of the tank in a heat exchange relation to the tank, so that in operation refrigerant flowing into the tank will warm the canister, and refrigerant flowing into the canister will cool the tank.

15. The device of claim 14 wherein the withdrawal means, the contaminant canister, the filter means, the moisture removing means, the compressor means, and the tank means form a fluid circuit wherein: the contaminant canister is disposed downstream of the withdrawal means, the filter means and moisture removing means are disposed downstream of the contaminant canister, the compressor means is disposed downstream of the filter means, and the tank is disposed downstream of the compressor means.

16. The device of claim 15 further comprising a valve means disposed downstream of the withdrawal means, the valve means being positionable in a recycle mode to form a closed-loop fluid circuit wherein the withdrawal means is by-passed, and refrigerant is permitted to flow between the tank and the contaminant canister.

17. The device of claim 14 wherein the filter means and the moisture removing means comprises a combined filter/dryer means.

18. The device of claim 14 wherein the tank includes a wall defining an exterior and a generally hollow exterior,
   the container includes a tank inlet means through which refrigerant can flow into the interior of the tank, a tank outlet means through which refrigerant can flow out from the interior of the tank, a canister inlet means through which refrigerant can flow into the canister, a canister outlet means through which refrigerant can flow out of the canister, and a contaminant removal means for removing contaminants from the canister.

19. The device of claim 18 wherein the canister includes a wall defining an exterior and a generally hollow interior,
   further comprising an anchoring plate means for anchoring the canister, tank inlet means, tank outlet means, canister inlet means, canister outlet means, and contaminant removal means to the container.

20. The device of claim 18 wherein the contaminant inlet means and the contaminant canister are configured to cause oil-type contaminants in the refrigerant to flow in a swirling motion in the contaminant canister to foster the condensation of droplets of contaminant against the wall of the canister.

* * * * *